Dec. 6, 1949     F. STEGMAIER     2,490,384
KNIFE FOR LAUTER MACHINES
Filed Sept. 19, 1946
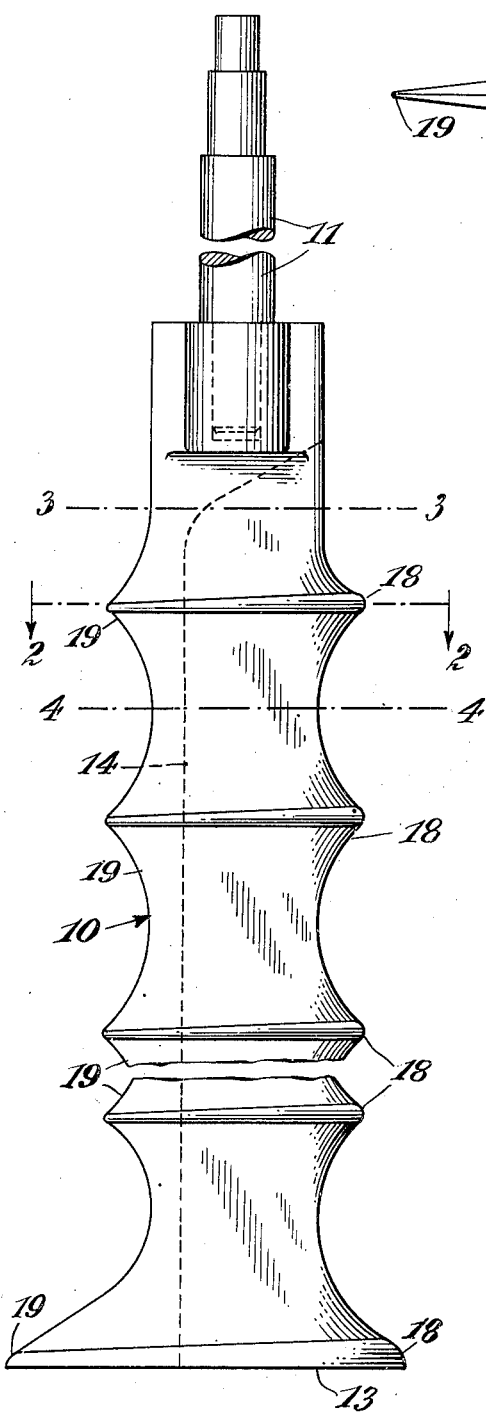
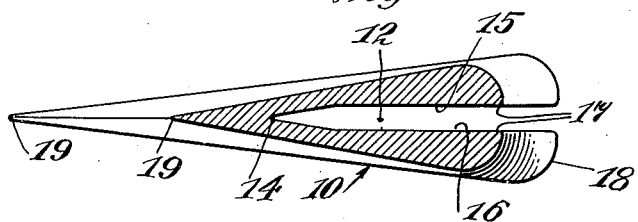
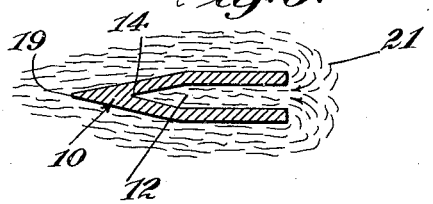
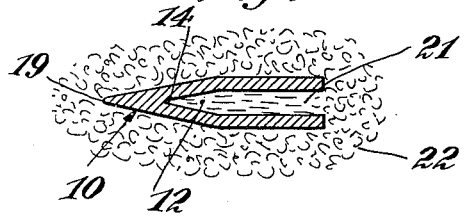
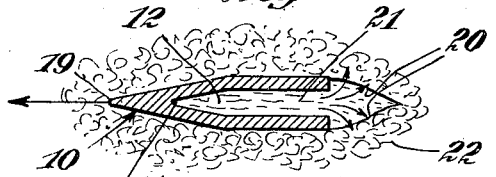
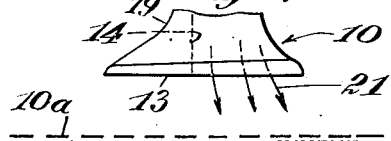
INVENTOR.
Fritz Stegmaier
BY C. P. Goepel
his ATTORNEY Patented Dec. 6, 1949

2,490,384

UNITED STATES PATENT OFFICE 2,490,384

KNIFE FOR LAUTER MACHINES

Fritz Stegmaier, New York, N. Y.

Application September 19, 1946, Serial No. 698,072

1 Claim. (Cl. 259—133)

This invention relates to knives for lauter machines.

The invention provides a rear ejection channel for water or thinner mash which is to enter the trough formed by the movement of the knife in the mash.

For this purpose, the invention consists of a knife for lauter machines, having a vertically arranged channel at the rear thereof, formed by walls extending from the top of the knife towards the bottom thereof, the upper part of the channel being at about the level of the mash contents of the tub, and preferably further in the channel, said channel extending through the bottom of the knife.

The invention will be further described, embodiments shown in the drawings, and the invention will be finally pointed out in the claim.

In the accompanying drawings,

Fig. 1 is a side elevation of my improved knife;

Fig. 2 is a horizontal section taken on line 2—2 of Fig. 1;

Fig. 3 is a diagrammatic section showing the relation of the knife to the water layer on the mash corresponding to the position of line 3—3 of Fig. 1;

Fig. 4 is a diagrammatic section showing the relation of the knife to the mash corresponding to the position of the line 4—4 of Fig. 1;

Fig. 5 is a diagrammatic section showing the relation of the water to the trough formed in the mash, when the knife is moving, the section being at the same point as that of Fig. 4; and Fig. 6 shows a fragmentary diagram of the water flow through the bottom of the knife into the mash.

Similar characters of reference indicate corresponding parts throughout the various views.

Referring to the drawings, the knife 10 shown in Fig. 1, has the known contour with the known stem 11 to enable it to be attached to the rotating arms of a lauter machine, which are well known and not shown. The known knives are solid without the channel as shown, but the improved knife has a wider cross section to allow for the rear ejection channel.

The improvement consists in providing a vertical channel 12 extending from a part of the knife which is usually above the level of the mash in the lauter tub, which level may be slightly above the line 3—3. The upper part of the mash is usually water or very thin mash. The channel 12 extends to the bottom of the knife at 13, which permits the water to descend into the lower layer of the mash usually below the lower extremities of the knives and above the false bottom 10a.

The channel 12 is formed by a vertical groove bounded by the vertical line 14 and by planular sidewalls 15 and 16, which groove is open as shown at 17. The channel so formed has its ejection portion at the rear 18 of the knife, in contrast to the solid sharp front part 19. The exterior of the knife is of stream line shape, with a sharp knife edge at the front and curved portions at the rear, said curved portions being substantially at right angles to the horizontal axis of the elongated groove.

In Fig. 2, the rear parts of the knife are curved to cause a slow closing of the trough through the mash as the knife progresses to permit the water to enter the vertical trough and the horizontal troughs formed by the contour of the knife as shown in Fig. 1, the table portions forming the horizontal troughs.

In Fig. 3, the diagrammatic section of the knife is shown as at a standstill, and shows the manner of the water or fluid filling the channel.

In Fig. 4, the water fluid is in the channel and is blocked from coming out by the thick mash, the diagrammatic view still showing a standstill position of the knife.

In Fig. 5, the knife 10 is advancing through the mash and forms a trough 20 in the mash, and the water in the channel 12 enters into the trough 20, passes through the rear ejection, and is distributed in the mash, and thus loosens the mash and brings about a steeping to take the extract out of the mash, where the channel passes through the bottom of the knife.

The operation is that as the tapering knife rotates in the lauter tub, the upper thin density layer of fluid is transferred to the body of the mash in a continuous supply by the rear ejection method, and thus facilitates the mash being treated. The multiplicity of knives with the improvement therein moved in an orbit by the supporting arms, thus circulates the top layer of the mash into the body of the mash, and facilitates the treatment of the body of the mash in the tub, thus requiring less time than heretofore.

The invention is applicable not alone to the usual lauter tubs or combination mash and lauter machines in the brewery art, but may also find application to the mash used in the distilling of liquors.

By the use of the channel, a floating or circulation of the lighter fluid is made use of, and quickly discharged into the body of the mash, and thereby a quicker discharge of the treated mash into the kettle from the lauter tube is achieved.

I have described several forms of my invention, but obviously various changes may be made in the details disclosed without departing from the spirit of the invention as set out in the following claim:

I claim:

In a knife for lauter machines having a contour tapering from its front knife edge to its widest portion, spaced parallel walls extending from the top of the knife towards the bottom thereof at the interior of the knife forming a vertical narrow channel open at the rear of the knife forming a rear ejection orifice along the rear of the knife, the walls forming the orifice at the rear exterior of the knife being curved substantially at right angles to the longitudinal axis of the channel and merging into the widest part of the front tapering contour of the knife, the upper part of the channel being at about the level of the mash contents of the tub and the lower part of said channel extending through the bottom of the knife.

FRITZ STEGMAIER.

REFERENCES CITED

The following references are of record in the file of this patent:

UNITED STATES PATENTS

| Number | Name | Date |
|---|---|---|
| 507,360 | Greig | Oct. 24, 1893 |
| 1,870,355 | Burns et al. | Aug. 9, 1932 |
| 1,958,301 | Greene | May 8, 1934 |
| 2,150,009 | Schock | Mar. 7, 1939 |